Figure 1:
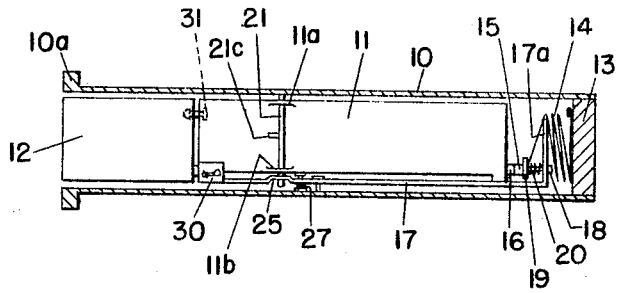

Aug. 30, 1966 P. B. BINDER ET AL 3,270,253

AUTOMATIC INTERLOCK SYSTEM

Filed Sept. 3, 1964 2 Sheets-Sheet 1

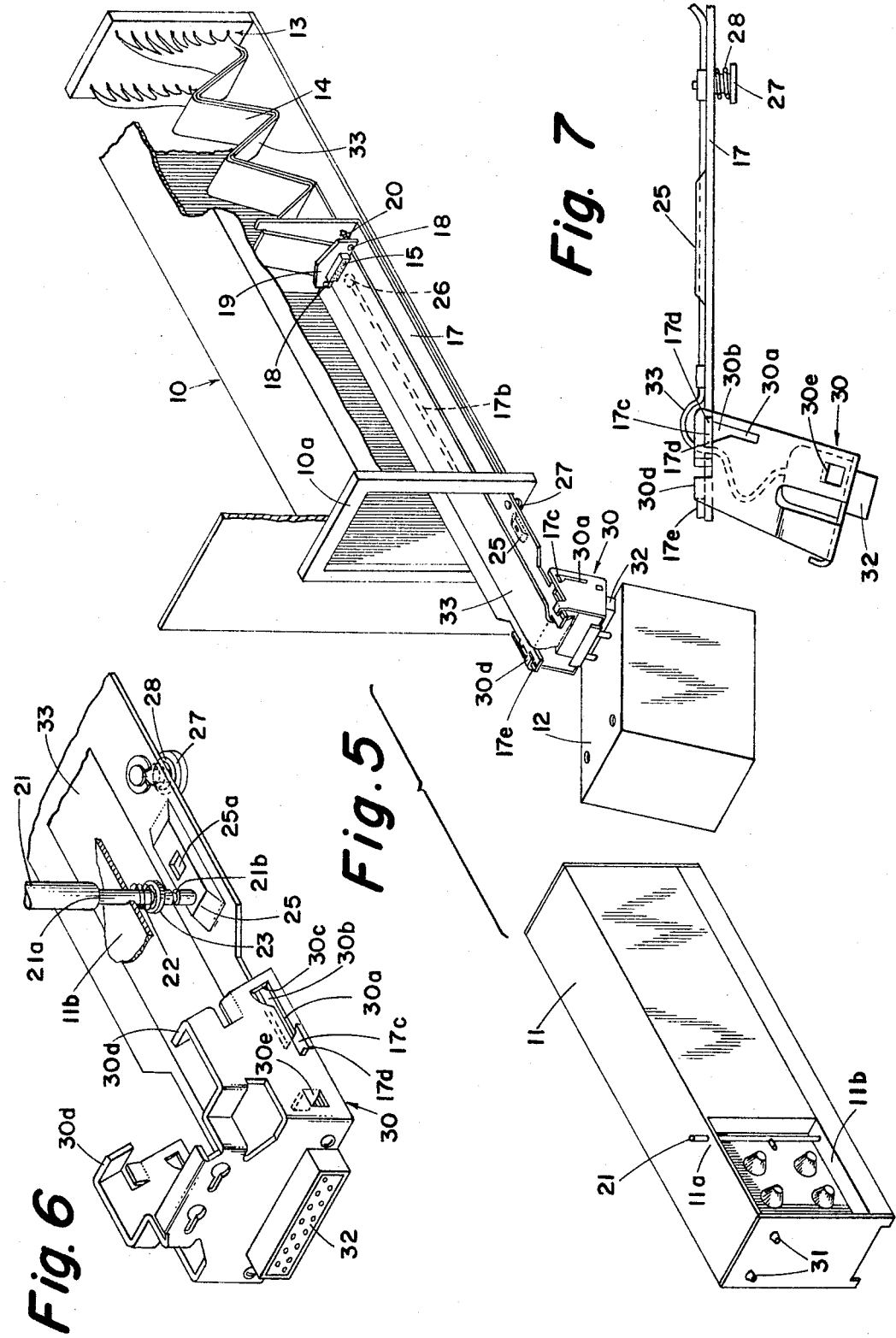

United States Patent Office 3,270,253
Patented August 30, 1966

3,270,253
AUTOMATIC INTERLOCK SYSTEM
Paul B. Binder, North Wales, and Richard B. Garvin, Feasterville, Pa., assignors to Leeds and Northrup Company, Philadelphia, Pa., a corporation of Pennsylvania
Filed Sept. 3, 1964, Ser. No. 394,260
10 Claims. (Cl. 317—120)

This invention relates to an automatic interlock system for assuring proper electrical connection between two electrical units thereby preventing any serious disturbance of a process when an inserted unit is removed or replaced in the system and has for an object the provision of an automatic interlocking system for assuring proper electrical connection between mating electrical connectors prior to insertion of a chassis into a case. This invention is particularly applicable to control systems where control and/or operating modules are inserted into enclosures or cases which are adapted for either panel or console mounting.

In accordance with the present invention there is provided an automatic interlock system for assuring proper electrical connection between mating electrical connectors prior to insertion of a module or chassis into a case. Such system comprises a chassis having a first electrical connector mounted at the rear end thereof and a slide having a second electrical connector mounted at the rear end thereof and adapted to mate with the first electrical connector. Adjustable locking structure is carried by the chassis at a predetermined distance from the first electrical connector and is adapted to be moved into and out of engagement with the case. Cam structure is carried by the slide at a corresponding distance from the second electrical connector and is adapted to engage the locking structure. The cam structure is so constructed and arranged with respect to the locking structure so that movement of the chassis relative to the slide in the direction of the case will move the locking structure into engagement with the case and thereby prevent entry of the chassis into the case until the electrical connectors have been moved into mating relation after which the cam structure causes the locking structure automatically to move out of engagement with the case and into locking engagement with the slide to permit the chassis and slide to move into the case.

The present invention is particularly applicable to control systems utilizing both control and operating modules in the same case thus including two chassis. Thus, further in accordance with the invention, there is provided a bracket and means for hinging the bracket to the front end of the slide. A third electrical connector is carried by the bracket and a second chassis is connected to the bracket and the third electrical connector at the rear of the second chassis. There is also provided means for supporting the second chassis in line with the first-named chassis for insertion of both of the chassis in the case.

More specifically, and further in accordance with one aspect of the invention, there is provided an automatic interlock system for assuring proper electrical connection between a plug and receptacle prior to insertion of a chassis into a case. The chassis is provided with a plug mounted on the rear end thereof and a slide is provided having a receptacle mounted at the rear end thereof and adapted to mate with the plug. A rod is carried by the chassis and is adjustable relative thereto. A ramp is carried by the slide and is adapted to be engaged by the lower end of the rod. The rod has a length sufficient to project above the chassis for engagement with the case when the rod is on the ramp and the ramp slopes upwardly from the front end of the slide to a drop-off on the ramp. The spacing between the plug and the rod corresponds to the spacing between a receptacle and the end of the ramp whereby the rod will not permit the chassis to be inserted in the case so long as the rod is on the ramp and when the rod drops off the end of the ramp, the plug and receptacle will be mated with each other.

Figure 2:
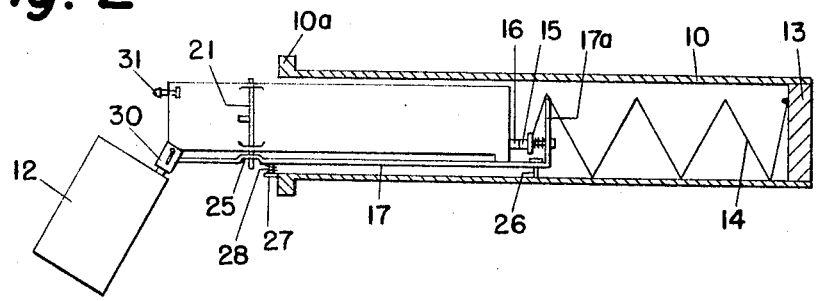
Figure 3:
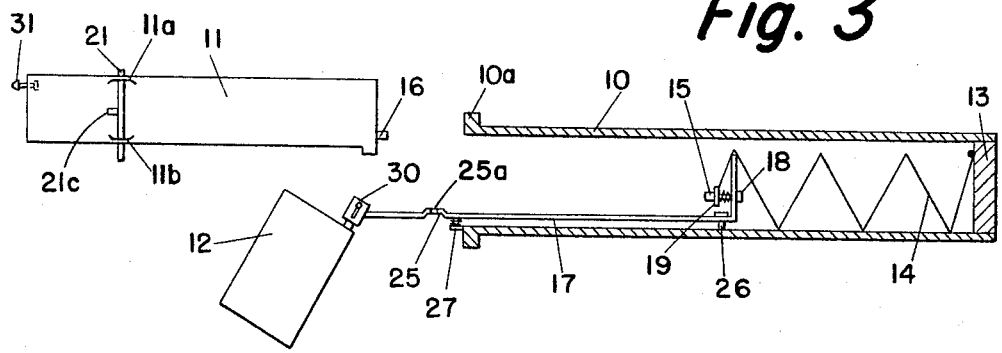
Figure 4:
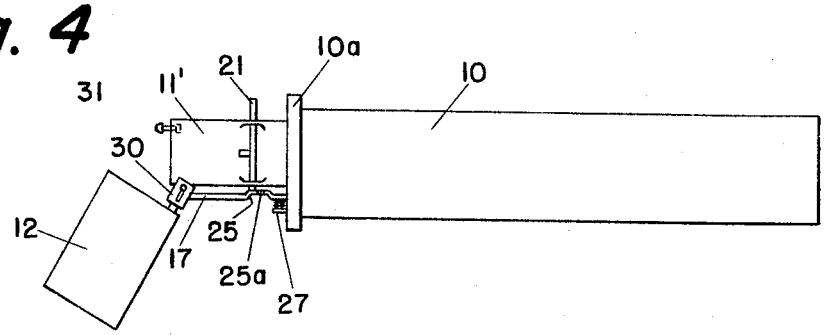

For a more detailed disclosure of the invention and for further objects and advantages thereof, reference is to be had to the following description taken in conjunction with the accompanying drawings in which:

FIG. 1 is an elevational view of an embodiment of the invention with the case shown in cross-section;
FIG. 2 is an elevational view similar to FIG. 1 with the modules or chassis partially removed from the case;
FIG. 3 is an elevational view similar to FIGS. 1 and 2 with the second module or chassis removed from the case;
FIG. 4 is an elevational view similar to FIGS. 1–3 preparatory to insertion of the modules or chassis into the case;
FIG. 5 is a perspective view similar to the apparatus diagrammatically illustrated in FIG. 3;
FIG. 6 is a fractional view showing the bracket of FIG. 5 in raised position; and
FIG. 7 is a side elevational view showing the bracket in lowered position.

Referring to FIGS. 1–4, there is shown a series of views of a control system embodying the present invention and utilizing modular-designed units. A system of this type normally includes a case or enclosure 10 which is adapted to receive both control and operating modules. In a typical installation, the first chassis 11 positioned at the rear of case 10 would contain the control module while the second chassis 12 located at the front of the case 10 would contain the operating module. The operating module is sometimes referred to as an operating station and normally includes indicating meters and front-of-panel adjustments.

As may be seen in FIGS. 1–5, the rear of the case 10 is provided with a terminal-board assembly 13 to which is connected one end of a flexible cable 14. The flexible cable 14 has been illustrated as of the type including multi-conductors which are embedded in a flat plastic sheet material which is adapted to be fan-folded so that it may be elongated as illustrated in FIG. 2 or contracted as illustrated in FIG. 1. The opposite end of the flexible cable 14 is provided with an electrical connector 15, preferably in the form of a female receptacle. A mating electrical connector in the form of a male plug 16 is carried by the rear end of the chassis 11. The electrical connectors 15 and 16 have been illustrated in mating relation in FIGS. 1 and 2.

As may be seen in FIG. 1, the chassis 11 is positioned within the case 10 above a slide 17, the rear end of which includes an upturned vertical portion 17a through which extend a pair of stud members 18 which in turn support a mounting plate 19 which carries the female receptacle 15. A pair of compression springs 20 are mounted on the studs 18 between the mounting plate 19 and the vertical portion 17a of the slide 17. Thus, when the male plug 16 is pressed into mating relation with the female receptacle 15, the springs 20 will be compressed thereby applying a force to the female receptacle 15 in the direction of the front end of the slide 17.

To maintain the electrical connectors 15 and 16 in mating relation, the chassis 11 is provided with adjustable locking structure in the form of a vertical rod 21 slideably carried by the chassis 11 and adjustable vertically thereof by means of a handle 21c. The rod 21 has an overall length less than the height of the case 10 so that the rod 21 will not interfere with the case 10 when the rod 21 is in its down position as illustrated in FIG. 1. The upper and lower ends of the rod 21 are adapted to extend through a pair of aligned holes in horizontal portions 11a and 11b of chassis 11. As may be seen in FIG. 6, the lower end of rod 21 is provided with a shoulder 21a which is of larger diameter than the hole in the corresponding section 11b of chassis 11. This shoulder 21a limits the downward movement of the rod 21. A compression spring 22, FIG. 6, is carried by the lower end of rod 21 and is positioned between the lower surface of chassis portion 11b and a shoulder or washer 23 carried by the rod 21. The compression spring 22 acts to bias the rod 21 in its down position as illustrated in FIG. 1. The lower end of the rod 21 is adapted to engage a cam surface in the form of a ramp 25 which slopes upwardly from the front end of the slide 17 to an opening 25a which defines a drop-off on the ramp, FIG. 6. When the electrical connectors 15 and 16 are in mating position as shown in FIG. 1, the lower end of the rod 21 will extend into the opening 25a. The lower end of the rod 21 is provided with groove structure 21b which is adapted to engage the drop-off 25a of the ramp 25. The force of the compression spring 20 presses the lower end of rod 21 against the drop-off 25a of the ramp 25 and the groove 21b, cooperating with the drop-off 25a, prevents the rod 21 from being accidentally dislodged.

When it is desired to change one of the modules of the system shown in FIG. 1, for example to replace the control unit within chassis 11, with a different control unit, the chassis 11 and 12 are both withdrawn from the case 10 to the position shown in FIG. 2. The slide 17 will be at its forward position with further outward movement of the slide 17 being limited by the projecting stud 26 which extends upwardly from the bottom of the case 10 and into a center slot 17b, in slide 17, as shown in FIG. 5. The stud 26 has an enlarged head which, during normal sliding movement of the slide 17, prevents the latter from being withdrawn completely from the case 10. The slide 17 also carries a bottom stop member 27 which is spring-biased to a down position as shown in FIG. 2 by means of compression spring 28. The stop member 27 cooperates with the stud 26 to maintain the slide 17 in the position shown in FIG. 2 during replacement of chassis 11 with a different chassis or control unit. The operating unit of chassis 12 is supported in its up-position of FIG. 1 by means of a bracket 30 hinged to the front end of slide 17, the construction of which is more clearly shown in FIG. 6 and the details of which will be described more fully hereinafter. The upper end of chassis 12 is connected to the forward end of chassis 11 by means of spring connector pins 31 which extend into openings at the rear end of chassis 12. The spring connector pins 31 are of a type well-known in the art, such for example, as the type manufactured by The Hartwell Corporation, Los Angeles, California, under the trade name Nylatch. When the spring pins 31 are released from the front chassis 12, the chassis 12 is adapted to pivot to a lower position as shown in FIGS. 2 and 5 without interruption of the electrical connections thereto. With the chassis 12 in the pivoted position, the chassis 11 is now ready to be removed from the case 10. This is accomplished by first pressing the chassis 11 in a direction toward the rear end of case 10 to compress the compression springs 20 which are associated with the female receptacle 15. This permits the groove 21b, FIG. 6, to be moved out of engagement with the drop-off of the ramp 25 as indicated at 25a thereby permitting the rod 21 to be raised vertically by means of the handle 21c and thus withdrawn from the drop-off 25a. The chassis 11 then complete with male plug 16 and rod 21 is withdrawn from the slide 17 as shown in FIG. 3. A new chassis 11', for example a different control unit, is then placed on the slide 17 as shown in FIG. 4. At this time it will be noted that the rod 21 has its lower end engaging the ramp 25 and the upper end of the rod 21 projects above the chassis 11' to an elevation higher than the top of case 10. Since the electrical connectors 15 and 16 are now both within the case 10, it is not possible for an operator to see whether or not the electrical connectors are in mating relation. As pointed out above, such electrical connectors must be in mating relation before the chassis are completely inserted into the case 10.

To insert the chassis 11' and 12 into the case 10, the chassis 12 is first pivoted from its down-position of FIG. 4 to its up-position as shown in FIG. 1. The operator then compresses the spring 28 on stop member 27 which permits the slide 17 to move inwardly of the case 10. However, if the electrical connectors 15 and 16 have not been moved into mating relation, the rod 21 will continue to rest on the ramp 25 as in FIG. 4. Thus, even though the stop member 27 has been moved out of the path of the case 10, the upper end of the rod 21 will still project above the chassis 11' a sufficient distance to engage the front end of the case 10 or a bezel 10a carried thereby. When this occurs, the operator withdraws the slide 17 from the interior of case 10 until it is again in the position of FIG. 4 with stop 27 spring biased to its lowered position for engagement with the case bezel 10a. He then pushes inwardly on the chassis 11' until the lower end of rod 21 moves off the end of ramp 25 and into the drop-off 25a as in FIG. 2. When this occurs, the rod 21 will drop into place at drop-off 25a under the biasing force of spring 22, FIG. 6. This automatically interlocks the electrical connectors 15 and 16 in the manner described above. The operator then presses up on the stop member 27 to move it out of engagement with the case bezel 10a so that the united chassis 11' and 12 may move into the case 10 to the position shown in FIG. 1. The system is then ready for operation with the new chassis 11' properly connected in the electrical circuit.

The details of the bracket structure 30 are more clearly shown in FIGS. 6 and 7. The bracket supports an electrical connector 32 which has been illustrated as of the female receptacle type to which is connected a conductor strip 33, the opposite end of which connects to the terminal-board assembly 13. The slide 17 is provided with flat extensions 17c at the opposite sides thereof for insertion into slot structure 30a extending along the sides of the bracket 30. It will be noted that the slot structure 30a has a narrow width at one end thereof corresponding to the thickness of the projecting structure 17c of the slide 17. As the projecting structure 17c is relatively wide, this structure, in cooperation with the slot structure 30a, is adapted to maintain the bracket 30 in the raised position of FIG. 6. When the bracket 30 is in the raised position of FIG. 6, it cooperates with the spring pin members 31, FIG. 1, on chassis 11 to maintain the chassis 12 in a position in line with the chassis 11 prior to insertion thereof in the case 10.

The bracket 30 also includes an arrangement for providing a positive locking position as well as a simple release with respect to the slide 17. As may be seen in FIG. 6, the bracket 30 is provided with a pair of inturned tabs 30e which are adapted to rest on the opposite edges of the slide 17. These tabs 30e provide additional structure for keeping the bracket 30 from pivoting downwardly. The slide 17 is provided, at its outer end, with raised projections 17e, FIG. 5, which engage the tabs 30e when the bracket 30 is in the up-position of FIG. 6 and keep the bracket 30 from moving to the left as viewed in FIG. 6. To pivot the bracket 30 down to the position shown in FIG. 7, the bracket 30 is first lifted up and pulled to the left until the tabs 30e clear the projections 17e, FIG. 5, and then the bracket 30 will be permitted to pivot downwardly to the position shown in FIG. 7.

As may be seen in FIGS. 6 and 7, one end of the slot structure 30a in the bracket 30 is provided with an enlarged area 30b which has a width greater than the width of the projections 17c which act as a hinge pin for bracket 30. The enlarged area 30b in the bracket 30 permits the bracket to pivot downwardly to the position shown in FIG. 7 and the ears 17d at the opposite ends of projection 17c retain the bracket 30 on the projection 17c. The rear end of the slots 30a are provided with flat surfaces 30c which are adapted to engage the upper surface of projection 17c when the bracket 30 is in the down-position of FIG. 7. At this time, the projections or ears 30d which extend from the opposite sides of bracket 30 will be in engagement with the upper surface of the slide 17 as shown in FIG. 7 to support the chassis 12 in this predetermined position out of line with the chassis 11.

While a preferred form of the invention has been described and illustrated herein, it is to be understood that further modifications thereof may be made within this scope of the appended claims.

What is claimed is:

1. An automatic interlock system for assuring proper electrical connection between a plug and receptacle prior to insertion of a chassis into a case comprising a chassis having a plug mounted at the rear end thereof, a slide having a receptacle mounted at the rear end thereof and adapted to mate with said plug, a rod carried by said chassis and movable relative thereto, a ramp carried by said slide for engagement by the lower end of said rod, said rod having a length sufficient to project above said chassis for engagement with the case when said rod is on said ramp, said ramp sloping upwardly from the front end of said slide, a drop-off on said ramp, the spacing between said plug and said rod corresponding to the spacing between said receptacle and said drop-off on said ramp whereby said rod will not permit said chassis to be inserted in the case so long as said rod is on said ramp, and when said rod drops off said ramp, said plug and said receptacle will be mated with each other.

2. An automatic interlock system for assuring proper electrical connection between mating electrical connectors prior to insertion of a chassis into a case comprising a chassis having a first electrical connector mounted at the rear end thereof, a slide having a second electrical connector mounted at the rear end thereof and adapted to mate with said first electrical connector, movable locking structure carried by said chassis at a predetermined distance from said first electrical connector for engagement with the case, and cam structure carried by said slide at a corresponding distance from said second electrical connector for engagement with said locking structure, said locking structure positioned with respect to said cam structure so that movement of said chassis relative to said slide in the direction of the case will move the locking structure into engagement with the case and thereby prevent entry of said chassis into the case until said electrical connectors have been moved into mating relation after which said cam structure allows said locking structure automatically to move out of engagement with the case and into locking relation with said slide to permit the chassis and slide to move into the case.

3. An automatic interlock system according to claim 2 including a bracket, means for hinging said bracket to the front end of said slide, a third electrical connector carried by said bracket, a second chassis, means for connecting said bracket and said third electrical connector to the rear of said second chassis, and means for supporting said second chassis in line with said first-named chassis for insertion of both thereof in the case.

4. An automatic interlock system according to claim 3 wherein said bracket is provided with slot structure extending along the sides thereof, said slide is provided with flat extensions projecting from the opposite edges thereof for insertion in said slot structure of said bracket, said slot structure of said bracket having an enlarged area at one end thereof to permit rotation of said bracket about the axis of said extensions whereby said second chassis may be pivoted downwardly to a predetermined position out of line with said first chassis to permit removal of said first chassis from the case without breaking electrical connection of said second chassis to said third electrical connector.

5. An automatic interlock system according to claim 4 wherein said bracket includes projecting structure engaging said slide when said bracket is pivoted downwardly to the predetermined position so as to support said bracket and said second chassis in said predetermined position.

6. An automatic interlock system according to claim 4 wherein said slot structure of said bracket has a narrow area at the end thereof opposite said enlarged area for receiving said extensions of said slide to maintain said bracket in line with said slide.

7. An automatic interlock system according to claim 2 wherein compression means is utilized for maintaining said second electrical connector at the rear end of said slide for applying a force to said second electrical connector in the direction of the front end of said slide when said first and second electrical connectors are in mating relation and when said locking structure is in locking engagement with said cam structure carried by said slide.

8. An automatic interlock system according to claim 2 including movable stop structure carried by said slide for engaging the case to prevent entry of said slide into the case until said stop structure has been moved out of the path of the case.

9. An automatic interlock system according to claim 4 wherein said bracket is provided with projecting structure for extending over said slide to maintain said bracket in line with said slide.

10. An automatic interlock system according to claim 9 wherein said slide is provided with raised projections at the outer end thereof for engaging said last-named projecting structure on said bracket to maintain the latter on said slide.

No references cited.

ROBERT K. SCHAEFER, *Primary Examiner.*